US005631068A

United States Patent [19]

Smith

[11] Patent Number: 5,631,068

[45] Date of Patent: May 20, 1997

[54] SELF-CONTAINING TAMPER EVIDENT TAPE AND LABEL

[75] Inventor: Christopher A. Smith, Redmond, Wash.

[73] Assignee: Trigon Packaging Corporation, Redmond, Wash.

[21] Appl. No.: 388,136

[22] Filed: Feb. 13, 1995

Related U.S. Application Data

[63] Continuation-in-part of Ser. No. 285,639, Aug. 2, 1994, abandoned.

[51] Int. Cl.[6] .......... B32B 3/00

[52] U.S. Cl. .......... 428/195; 428/174; 428/204; 428/207; 428/212; 428/411.1; 428/488.4; 428/523; 428/913

[58] Field of Search .......... 428/35.2, 35.7, 428/40, 192, 204, 207, 212, 343, 352, 353, 523, 713, 411.1, 488.4; 383/5; 206/459.1, 459.5, 807; 220/359, 720; 229/80; 427/207.1, 258, 322, 412.1

[56] References Cited

U.S. PATENT DOCUMENTS

| | | | |
|---|---|---|---|
| 3,631,617 | 1/1972 | Pekko | 40/2.2 |
| 3,896,965 | 7/1975 | Cornell | 220/359 |
| 3,923,198 | 12/1975 | Brochman | 220/359 |
| 3,935,960 | 2/1976 | Cornell | 220/260 |
| 4,509,196 | 4/1985 | Sak et al. | 383/5 |
| 4,566,627 | 1/1986 | Gendron | 229/81 |
| 4,709,396 | 11/1987 | Voshall et al. | 383/5 |
| 4,718,553 | 1/1988 | Adamoli et al. | 205/459 |
| 4,763,931 | 8/1988 | Matsuguchi et al. | |
| 4,810,745 | 3/1989 | Pike et al. | 524/516 |
| 4,816,305 | 3/1989 | Stillwell et al. | 428/35.7 |
| 4,826,213 | 5/1989 | Matsuguchi et al. | |
| 4,834,552 | 5/1989 | Makowka | 383/5 |
| 4,838,708 | 6/1989 | Holcomb et al. | 383/5 |
| 4,859,521 | 8/1989 | Pike et al. | 428/195 |
| 4,876,123 | 10/1989 | Rivera et al. | 428/34.2 |
| 4,911,302 | 3/1990 | Butler et al. | 206/459 |
| 4,931,327 | 6/1990 | Liu et al. | 428/36.5 |
| 4,937,040 | 6/1990 | Holcomb et al. | 383/5 |
| 4,941,196 | 7/1990 | Edelman et al. | 383/5 |
| 4,980,222 | 12/1990 | Rivera et al. | 428/195 |
| 5,060,848 | 10/1991 | Ewan | 229/102 |
| 5,064,664 | 11/1991 | Hustad | 426/87 |
| 5,077,001 | 12/1991 | Makowka | 383/5 |

FOREIGN PATENT DOCUMENTS

| | | |
|---|---|---|
| 0349160 | 1/1990 | European Pat. Off. . |
| 0396428 | 11/1990 | European Pat. Off. . |
| 2317178 | 2/1977 | France . |
| 2597405 | 10/1987 | France . |
| 2003449 | 3/1979 | United Kingdom . |
| 2202823 | 11/1988 | United Kingdom . |
| 2243825 | 11/1991 | United Kingdom . |
| WO91/04199 | 4/1991 | WIPO . |
| WO91/18377 | 11/1991 | WIPO . |
| WO93/00269 | 1/1993 | WIPO . |

*Primary Examiner*—William Krynski
*Attorney, Agent, or Firm*—Bell, Seltzer, Park & Gibson, P.A.

[57] ABSTRACT

A tape or label for sealing a container that provides visual evidence if the seal is forced open or cooled below a breakdown temperature. The tape includes a plastic strip, a layer of ink printed on a surface of the plastic strip, and a layer of pressure-sensitive adhesive. The tape can be incorporated into a bag for sealing the bag closed. The tape includes an ink layer that is sandwiched between the plastic strip and the adhesive layer. The adhesive can be secured to portions of a bag to seal it closed. If the seal is forced open, the ink layer visibly delaminates from the plastic strip. The adhesive layer and the plastic strip are chosen to have different rates of shrinking when cooled, so that when the tape is cooled below its breakdown temperature, the ink layer delaminates. In an alternative embodiment of the tape, two layers of ink are printed onto the plastic strip. The first layer of ink is clear and is printed onto the untreated plastic strip in a pattern. The second layer of ink is opaque and is printed uniformly over the plastic strip and the clear ink after the plastic strip is treated.

12 Claims, 7 Drawing Sheets

SELF-CONTAINING TAMPER EVIDENT TAPE AND LABEL

This application is a continuation-in-part of prior U.S. application Ser. No. 08/285,639 entitled Self Containing Tamper-Evident Seal filed Aug. 2, 1994, now abandoned.

FIELD OF THE INVENTION

This invention relates generally to tamper-evident closures and, more particularly, a closure in the form of a tape or label that indicates a forced opening and cooling below a particular temperature.

BACKGROUND OF THE INVENTION

Tamper-evident closures for containers such as bags, envelopes, packages, etc. and tamper-evident tapes and labels for use with bags, envelopes, and other packages have been available for several years. Generally, if these existing closures are forced open, the visual appearance of the closure changes so as to provide an indication that the contents of the container have been accessed. Containers fabricated having tamper-evident closures are commonly used in industries in which the contents of the containers must be maintained in tight security, for example, in the banking industry. In certain instances package manufacturers employ prefabricated closures in the form of a tape or label to provide a tamper-evident closure on their packaging. Tamper-evident closures in the form of tapes or labels are also often used by everyday consumers who want to ensure that their packages are securely sealed and will evidence tampering if it occurs.

One form of container commonly used in banking and other industries is a bag, pouch or envelope (generally referred to herein as a bag) formed of a plastic material such as polyethylene. The opening in this type of bag is commonly closed with a pressure-sensitive adhesive located on one side of the bag. To close the bag, a peel-back strip covering the free side of the adhesive is removed, and the exposed surface of the adhesive is then pressed against the opposite side of the bag. Generally, if a bag of this type is later forced open, the pressure-sensitive adhesive and/or other parts of the bag will distort and break apart, so as to provide an indication that the bag has been opened, possibly without authorization. Closures for a bag of this type have been formed with layers in addition to the pressure-sensitive adhesive to provide a clearer indication of when the closure is forced open. For example, U.S. Pat. No. 5,060,848 to F. R. Ewan describes a tamper evident seal that uses a layer of nitrocellulose or acrylic ink that breaks apart in a selected pattern when the seal is forced open. The layer of ink is adhered to a polyester panel that is part of the seal. Before applying the ink, the plastic panel is masked with a desired pattern of a silicon oil releasant material, which normally causes the ink to break apart in the masked pattern when the seal is forced open. Also, to ensure that the ink layer adheres to the silicon oil releasant material and polyester panel, a primer is applied over the silicon oil releasant, and the ink is then applied over the primer.

Unfortunately, bags of this type are generally expensive to manufacture, use hazardous materials, and are not easily recycled. For example, the polyester panel disclosed in U.S. Pat. No. 5,060,848 to F. R. Ewan is not easily recycled, and the primer required is hazardous. Furthermore, thieves have devised a scheme to gain access to the contents of bags of this type without detection. The scheme devised involves spraying a liquid refrigerant onto the adhesive to freeze the adhesive down to its transition temperature, generally at about −10° F. At this temperature, the adhesive becomes brittle and loses its adhesive qualities, i.e., tack. The thief is then able to open the bag and remove certain contents. The thief allows the adhesive to warm back to room temperature, at which point the adhesive regains its tack, and then simply recloses the bag by applying pressure, all without any evidence of tampering.

Tamper-evident closures for plastic bags have been formed to combat the problem of refrigerant tampering. Such closures provide an indication that the bag was opened, whether or not a refrigerant is first applied. These closures include multiple adhesive and nonadhesive layers that have differing strengths so that when the closure is forced open, one or more of the layers is permanently altered, even if a refrigerant is first applied. For example, U.S. Pat. No. 4,834,552 to K. R. Makowka describes a tamper-evident seal for a plastic envelope. The tamper-evident seal comprises two paper layers and an adhesive layer. One of the paper layers is bonded to a closure flap on the back wall of the envelope, the other paper layer is bonded to the front wall of the envelope, and the adhesive layer is applied to the free side of one of the paper layers. To close the envelope, the closure flap is folded over the envelope opening, and the adhesive layer is pressed onto the paper layer that has a free side. The adhesive seeps into the interstices of the paper layers to form a mechanical-type lock with the paper layers. The strength of this mechanical-type lock is apparently greater than the internal strength of the paper layers, even if a refrigerant is first applied, so that the paper layers break apart when the seal is forced open.

Unfortunately, closures such as the seal disclosed in the Makowka patent have several shortcomings. These closures do not provide any evidence of refrigerant tampering unless the closure is actually forced open. Thus, if a thief begins to attempt to open a bag by applying a refrigerant, but his efforts are somehow thwarted before he is able to force the bag open, the thief's tampering will go undetected. Even if these closures are forced open, they do not always satisfactorily provide evidence of such tampering. Any delamination of one of the paper layers can only be detected by close inspection; the delamination is not bold and distinct as would be desired. Once the closure is forced open, it is possible to use additional adhesive/glue to reclose the closure, without any readily visible evidence that the closure was ever opened. In addition, these closures generally have high production costs. For example, in addition to an adhesive layer as is commonly used to close plastic bags, the closure described in the Makowka patent requires two paper layers, which must both be bonded to the envelope during its production. Furthermore, the bag and closure taught by the Makowka patent is not readily recyclable.

To overcome these shortcomings in the existing technology, what is needed is a closure in the form of a tape or label that provides evidence of forced opening of a seal created by the tape or label, regardless of whether a refrigerant is applied, and additionally, provides evidence of refrigerant tampering, regardless of whether the closure is actually opened. The tape or label should be easy to close, and the evidence of tampering provided should be readily visible, i.e., bold and distinct. Furthermore, the tape or label providing these features should also be relatively inexpensive and easy to recycle and include only nonhazardous materials. As explained in the following, the present invention provides a tape and label that meets these criteria.

SUMMARY OF THE INVENTION

In accordance with this invention, a bag closure that provides evidence of refrigerant tampering is provided. The bag closure is sensitive to being cooled below a particular "breakdown temperature," so that if a refrigerant is applied, the visual appearance of the closure permanently changes, regardless of whether the closure is opened. In one preferred embodiment of the invention, the closure includes an adhesive layer and a delaminating layer that visibly delaminates when the closure is cooled below the breakdown temperature. The bag includes a back and front wall that are joined at their peripheral side and bottom edges. The opening of the bag is formed by the upper ends of the back and front walls, and the closure is located at this opening.

In accordance with further aspects of the invention, one surface of the delaminating layer is bonded to a closure flap formed at the upper end of the bag front wall. When the closure is closed, the opposite surface of the delaminating layer is adhered to one surface of the adhesive layer, and the opposite surface of the adhesive layer is adhered to the bag back wall. Further, in one preferred embodiment, the bag is formed so that one surface of the adhesive layer is adhered to the bag back wall and the opposite surface of the adhesive layer is covered with a peel-back strip. To close the closure, the peel-back strip is removed and the free surface of the adhesive layer is pressed against the delaminating layer.

In accordance with still further aspects of the invention, as the closure is cooled, e.g., with a refrigerant, the delaminating layer delaminates from the front wall prior to the adhesive layer losing its tack, which occurs when the adhesive layer reaches its transition temperature. Thus, an indication of refrigerant tampering is provided before the refrigerant allows the closure to be easily opened. Furthermore, the delaminating layer delaminates regardless of whether the closure is actually opened, so that the closure provides evidence of the mere application of a refrigerant. Also, regardless of whether a refrigerant is first applied, the delaminating layer delaminates whenever the closure is opened, so as to provide an indication that the contents of the bag have been accessed.

In accordance with still further aspects of the invention, the delaminating layer comprises a layer of ink that is applied to the closure flap on the bag front wall. Furthermore, the adhesive layer comprises a pressure-sensitive adhesive and the closure flap comprises a plastic material. The closure flap, ink, and pressure-sensitive adhesive are chosen so that when the temperature of the closure is above the transition temperature of the adhesive, the bond (i.e., affinity) between the ink layer and the adhesive layer is at least as strong as (and preferably stronger than) the bond between the ink layer and the closure flap. As a result, the ink layer delaminates when the closure is forced open. Also, the adhesive layer and the closure flap are chosen such that, when cooled, the closure flap and the adhesive layer shrink at different rates. As a result, the ink layer—which is sandwiched between the adhesive layer and closure flap—delaminates as the closure is cooled below the breakdown temperature. Preferably, both the ink and closure flap have contrasting colors so that delamination of the ink can be easily seen. Further, in one preferred embodiment, the closure flap comprises a polyethylene plastic and the ink is water based. In one preferred embodiment, the ink is in direct contact with the closure flap without any intervening primer or releasant, and the closure flap is not pretreated (e.g., by corona discharge). A process for manufacturing this bag closure is also provided by the invention.

In a second preferred embodiment of the invention, the previously described delaminating layer of the bag closure includes two layers of ink. A patterned layer of clear ink is applied directly to the closure flap without any intervening primer or releasant, or pretreating of the closure flap. For example, the clear ink can be applied in a pattern to form a series of "stop signs." After the pattern of clear ink is applied, the closure flap is treated, e.g., with a corona discharge process, so that the ink more readily adheres to the closure flap. Then a uniform layer of colored ink is applied over the patterned layer of clear ink and ink-free portions of the closure flap. When the closure flap is closed, the two ink layers are sandwiched between the adhesive and the closure flap, which is preferably a polyethylene plastic. If the closure flap is quickly "frozen" or forced open, the clear ink, and the colored ink positioned over the clear ink, delaminates from the closure flap. The colored ink in between the clear ink pattern remains on the closure flap, so that the pattern of the clear ink appears.

In accordance with another aspect of the present invention, a tamper evident tape or label formed similarly to the tamper-evident closure described above is provided. In one preferred embodiment of this aspect of the present invention, a polyethylene plastic layer is used to form the tape or label backing. A layer of ink is applied to the plastic layer, and a layer of pressure-sensitive adhesive is then applied over the ink. The tape or label is secured by pressing the adhesive layer onto the desired surface. As with the closures described above, if a thief or other unauthorized person applies a refrigerant to the tape and/or forces the tape open, the tape provides permanent evidence of such tampering by visible delamination of the ink layer.

As will be appreciated from the foregoing brief summary, this invention provides a tape or label that can be used as a bag closure that provides evidence of the mere application of a refrigerant, regardless of whether the closure is actually forced open. Furthermore, if the closure is forced open, whether or not a refrigerant is first applied, the tape or label provides a permanent indication that the closure was opened. As will be further appreciated from the foregoing brief summary, the tapes and labels and corresponding manufacturing process provided by this invention present a cost savings over existing tapes and labels since they include a minimal number of layers which are inexpensive to form. The materials used are inexpensive and nonhazardous. Furthermore, because the tape and labels are preferably formed of a polyethylene plastic, they are easily recycled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1B:
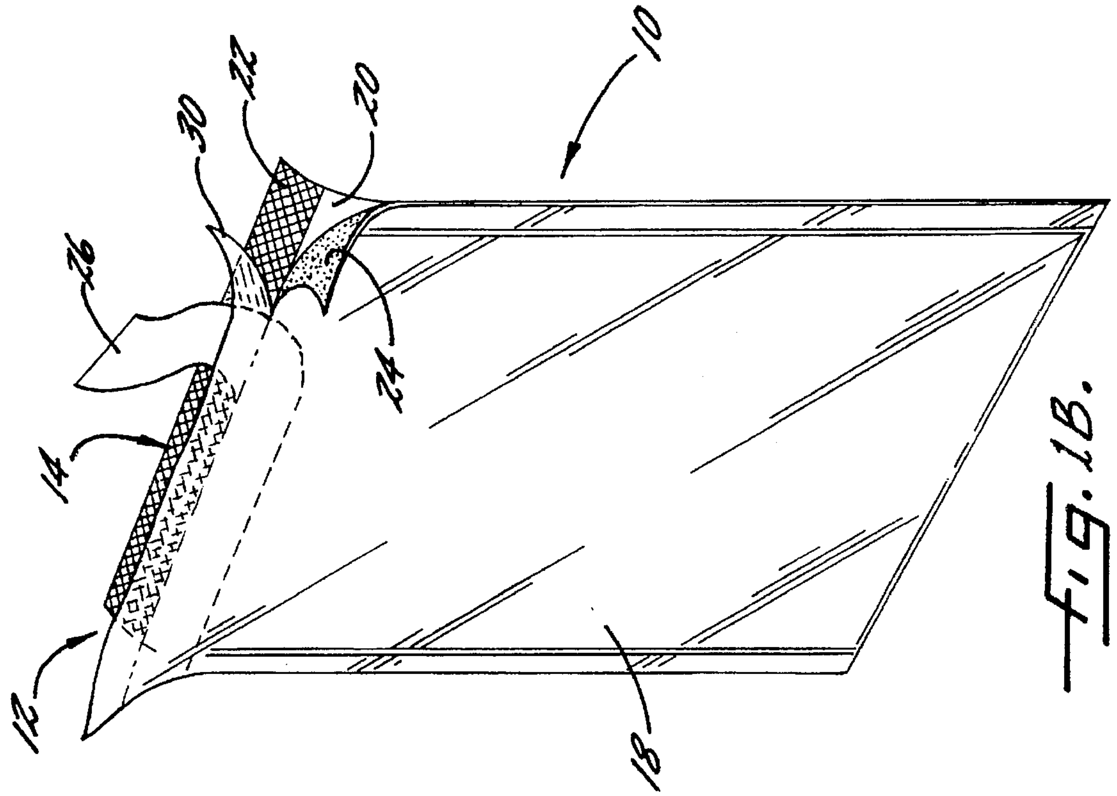
FIGS. 1A and 1B are pictorial views of a bag including a tamper-evident seal formed in accordance with the invention.
Figure 1A:
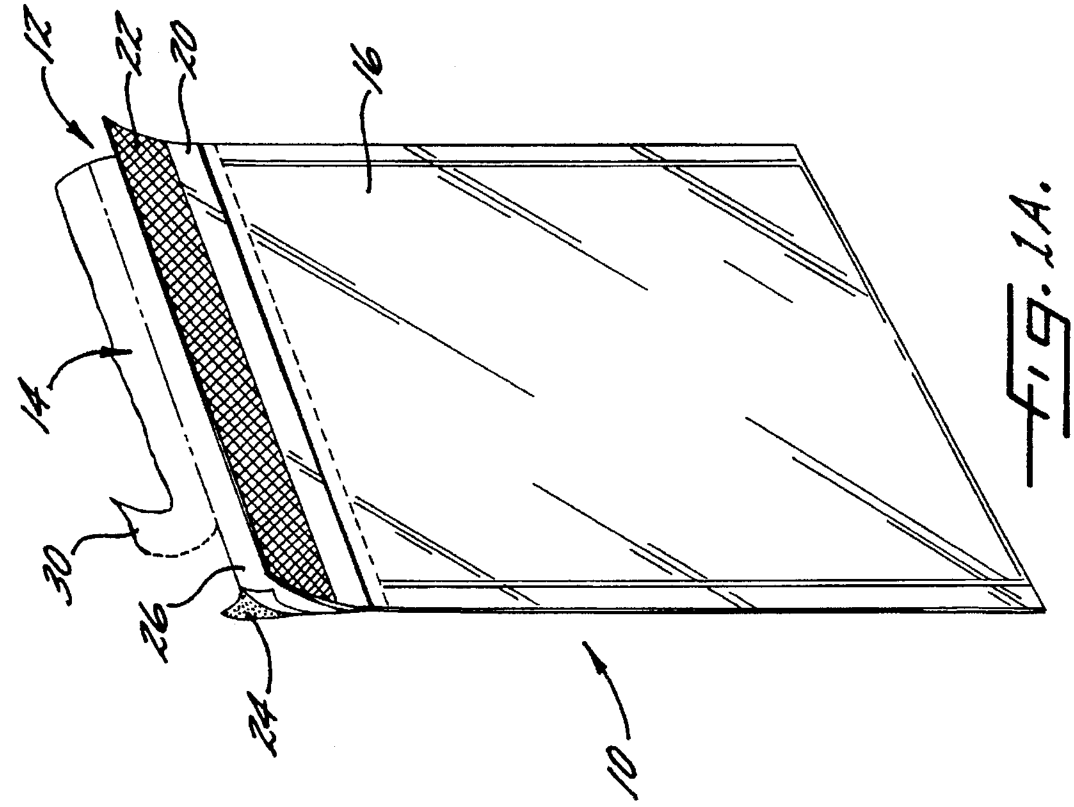

FIGS. 1A and 1B illustrate a bag 10 that incorporates a seal 12 formed at the opening 14 of bag 10. The bag includes a front wall 16 and a back wall 18 that are joined together at the bottom and side edges to form an enclosure having opening 14 at the upper ends of front wall 16 and back wall 18. Seal 12 is included to close opening 14 and to provide visual evidence of any forced opening of seal 12. Furthermore, seal 12 will visually distort if the opening of the bag is cooled below a particular "breakdown temperature," e.g., by the application of a refrigerant.

Seal 12 includes a plastic strip 20, a layer of ink 22, and a layer of adhesive 24. The bottom end of plastic strip 20 is attached to the inner surface of the upper end of front wall 16. Ink layer 22 is printed on the inner surface of plastic strip 20. While ink layer 22 is represented by a grid of lines in the figures, ink layer 22 is preferably a uniform layer of ink. As shown in FIGS. 1A and 1B, adhesive layer 24 is preferably applied to the inner surface of the upper end of back wall 18. The free surface of adhesive layer 24 is covered with a peel-back strip 26. To seal the opening of the bag closed, peel-back strip 26 is removed from adhesive layer 24, and plastic strip 20 is pressed onto adhesive layer 24, which is a pressure sensitive adhesive. Thus, when seal 12 is closed, ink layer 22 is sandwiched between adhesive layer 24 and plastic strip 20.

Figure 2A:
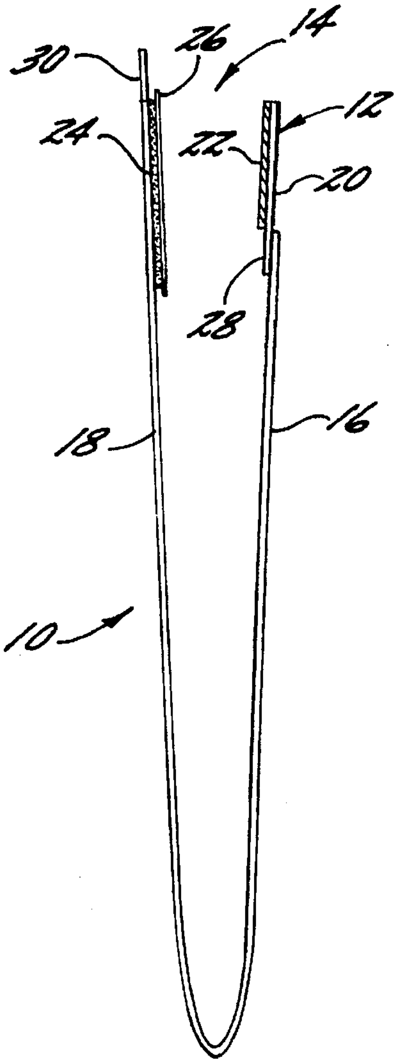
FIG. 2A is a side cross-sectional view of the bag shown in FIGS. 1A and 1B.
Figure 2B:
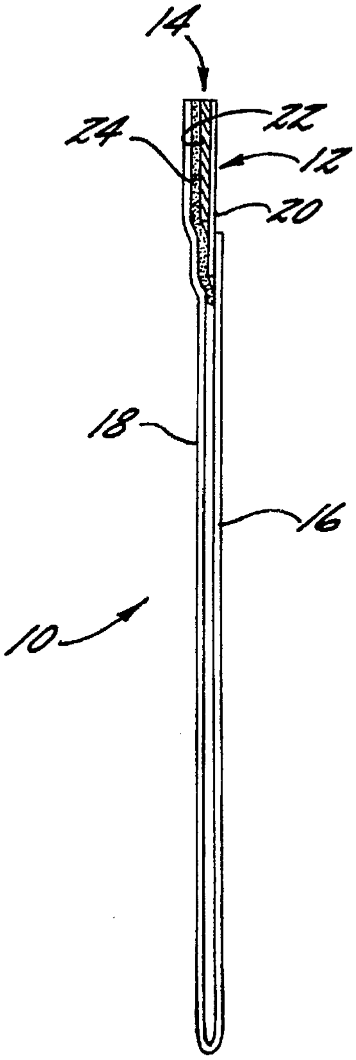
FIG. 2B is a side cross-sectional view of the bag with the seal closed.

The location of the various layers of seal 12 can be seen more definitely in the side cross-sectional views in FIGS. 2A and 2B. Plastic strip 20 is attached at its lower end 28 to the inner surface of the upper end of front wall 16, and ink layer 22 is printed on the inner surface of plastic strip 20. Adhesive layer 24 is applied to the inner surface of the upper end of back wall 18, and the free surface of adhesive layer 24 is covered with peel-back strip 26. FIG. 2B illustrates the alignment of seal 12 after peel-back strip 26 is removed and the seal is pressed closed. Plastic strip 20 is pressed onto adhesive layer 24 so that ink layer 22 adheres to adhesive layer 24.

As shown in FIGS. 2A and 2B, adhesive layer 24 preferably extends approximately an eighth of an inch below the bottom edge of plastic strip 20, so that when seal 12 is closed, a portion of adhesive layer 24 adheres directly to front wall 16. This helps prevent loose contents within the bag from partially opening seal 12 as the contents bump against the seal. Without a portion of adhesive layer 24 adhering to front wall 16, contents within the bag could falsely activate the tamper evidencing means of seal 12.

Preferably, back wall 18 includes a detachable identification tab 30 formed by perforating the upper end of back wall 18. As shown in FIGS. 1A and 1B, the perforations allow identification tab 30 to be easily removed. Preferably, identifying text or numbers are printed on identification tab 30 and matching identifying text or numbers are printed on either front wall 16 or back wall 18 of the bag. When the bag is sealed closed, identification tab 30 can be removed and used as a receipt.

Figure 4A:
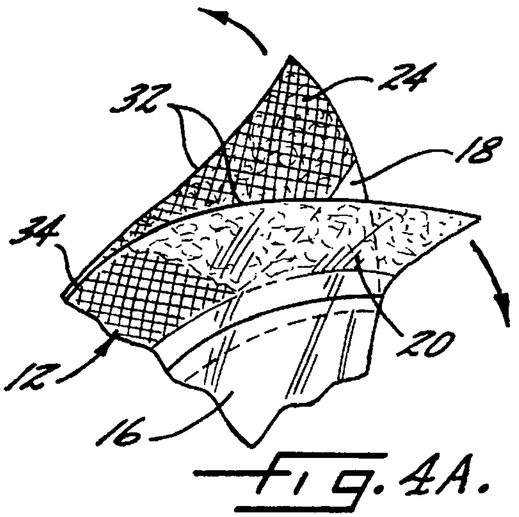
FIG. 4A is a pictorial view of the seal illustrating how the seal visually distorts if the seal is forced open.
Figure 3:
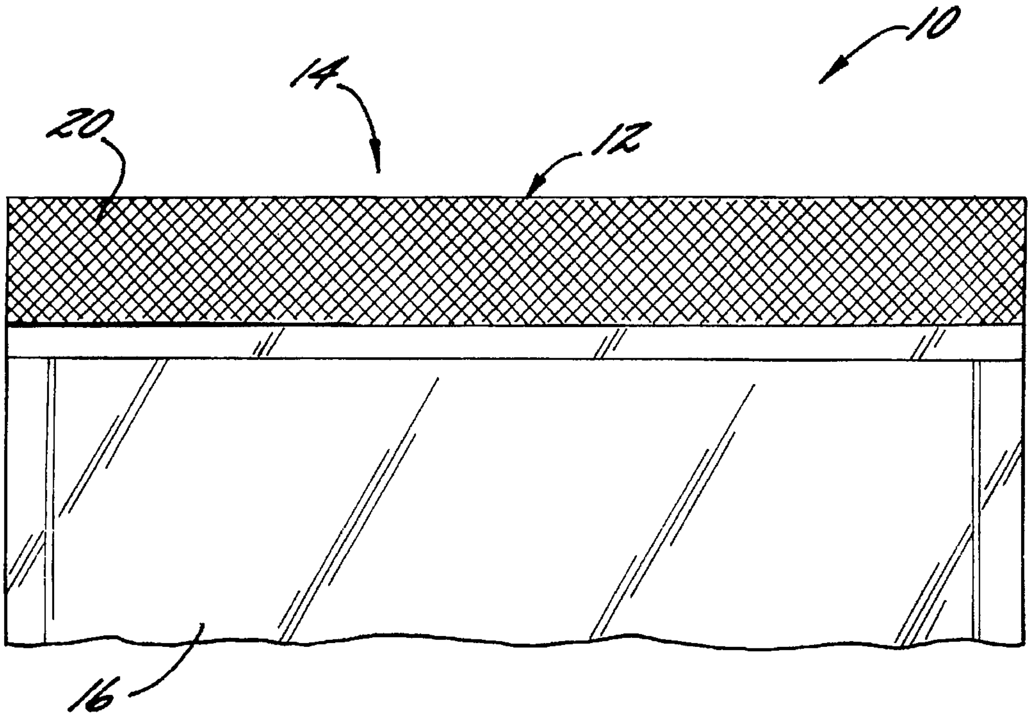
FIG. 3 is a front view of the bag illustrating the visual appearance of the seal when closed.

After being closed, if seal 12 is forced open, the seal visually distorts. Plastic strip 20 is partially transparent so that ink layer 22 can be seen from the outer side of plastic strip 20 before seal 12 is closed, as shown in FIG. 1A, and after seal 12 is closed, as shown in FIG. 3, which is a front view of the bag with seal 12 closed. In particular, objects that are in direct contact with the inner surface of plastic strip 20 can be seen from the outer side of plastic strip 20. In contrast, if an object is positioned near the inner surface side of plastic strip 20, but not in direct contact with the inner surface of plastic strip 20, the object can barely be seen, if at all, from the outer side of plastic strip 20. Accordingly, when ink layer 22 is printed on the inner surface of plastic strip 20, the ink can be seen from the outer surface of plastic strip 20, as shown in FIG. 1A and FIG. 3. However, as illustrated in FIG. 4A, if seal 12 is forced open, a substantial portion of the ink remains adhered to adhesive layer 24 and accordingly delaminates from plastic strip 20. When this occurs, the ink is no longer visible from the outer side of plastic strip 20.

Figure 4B:
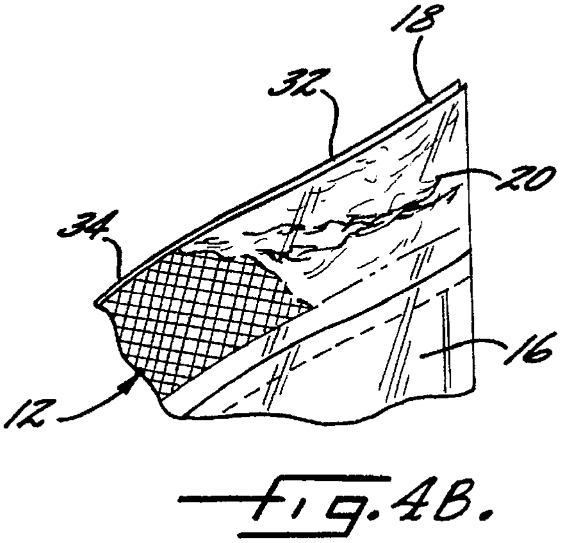
FIG. 4B is a pictorial view illustrating how the visual distortion remains, even if the seal is reclosed.

If an attempt is made to re-close seal 12, the visual distortion of the ink is still visibly apparent, as illustrated in FIG. 4B, because the ink does not re-adhere to plastic strip 20. The ink is printed onto plastic strip 20 while wet, i.e., in a liquid state. The ink then dries. Once dried, if the ink is delaminated from plastic strip 20, the ink no longer adheres to the inner surface of plastic strip 20. As a result, even when plastic strip 20 is re-pressed against adhesive layer 24, the ink remains sufficiently separated from plastic strip 20 so that the ink cannot be clearly seen through the outer side of plastic strip 20. In the illustration shown in FIGS. 4A and 4B, a portion 32 of seal 12 is forced open and then re-closed. As illustrated in FIG. 4B, portion 32 that was forced open is visibly distorted, in sharp contrast to the portion 34 of seal 12 that was not opened.

In order for ink layer 22 to delaminate from plastic strip 20 when the seal is forced open, it is necessary that the bond between the ink and plastic strip 20 be relatively weak, i.e., weak relative to the bond between adhesive layer 24 and ink layer 22. Because the bond between the ink and plastic strip 20 is relatively weak, if adhesive layer 24 merely adhered to ink layer 22, the overall strength of seal 12 would be relatively weak. Adhesive layer 24 would simply release from plastic strip 20 whenever ink layer 22 delaminated from plastic strip 20. This could cause the seal to inadvertently open during handling and shipping of the bag, which would be highly undesirable. To avoid this potential problem, ink layer 22 is sufficiently thin so that there are voids in ink layer 22. As a result, when seal 12 is pressed closed, portions of adhesive layer 24 adhere to the inner surface of plastic strip 20 through the voids in the ink. The affinity between the adhesive and the plastic strip is sufficiently high so that the strength of seal 12 is acceptably strong. Thus, seal 12 generally does not open unless it is intentionally forced open by pulling plastic strip 20 away from back wall 18.

Figure 5:
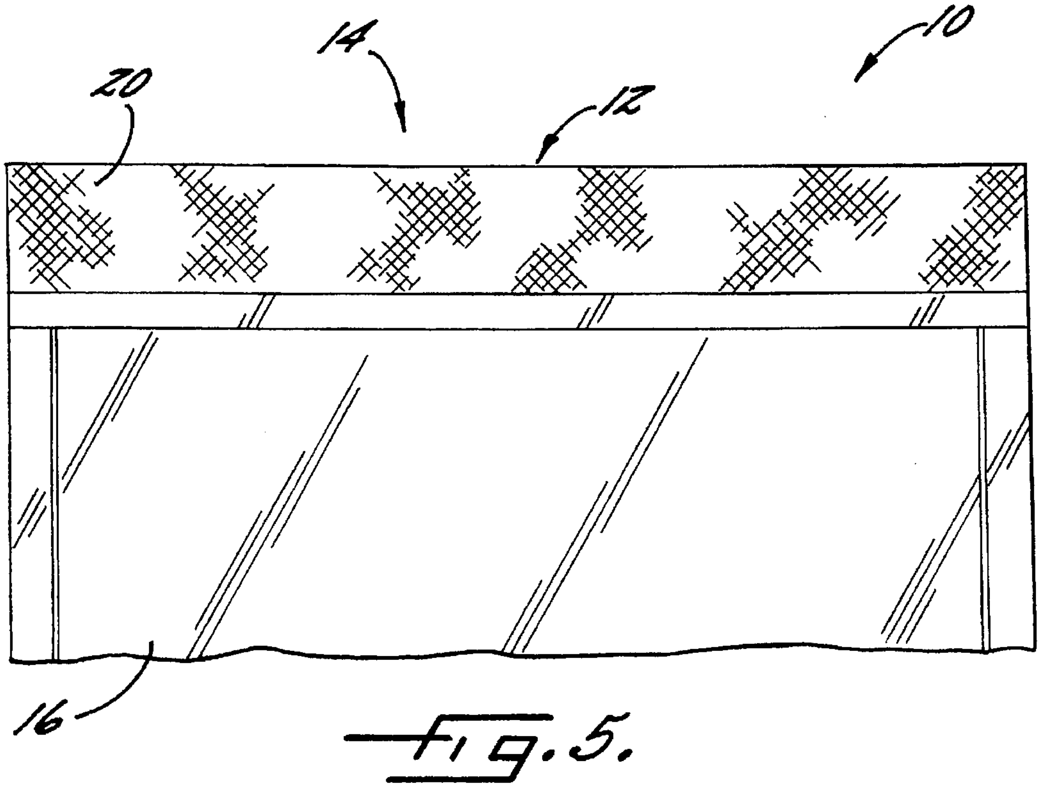
FIG. 5 is a front view of the bag illustrating the visual distortion of the seal that occurs when the seal is cooled below a particular temperature.

In addition to distorting when forced open, seal 12 is sensitive to cooling so that if the seal is cooled below a particular "breakdown temperature," e.g., −10° F., the seal visibly distorts in a manner similar to when the seal is forced open. In particular, as illustrated in FIG. 5, when the seal is cooled below a breakdown temperature, ink layer 22 delaminates from plastic strip 20 so that the ink can no longer be clearly seen when viewing the outer side of plastic strip 20. The mechanism for the delamination of the ink is differential rates of shrinking of adhesive layer 24 and plastic strip 20. In particular, plastic strip 20 and adhesive layer 24 are chosen so that they shrink at different rates when cooled. In a preferred embodiment, the adhesive shrinks more and at a greater rate than plastic strip 20. Because the ink has a strong affinity to the adhesive, as the adhesive and the plastic strip shrink at different rates, ink layer 22, which is sandwiched between the plastic strip and the adhesive, is pulled away from the plastic strip. As a result, the ink is no longer clearly visible through the outer side of plastic strip 20.

The ability of seal 12 to provide visual evidence of cooling is important because a common technique used by thieves to gain access to plastic bags sealed with a pressure sensitive adhesive is to "freeze" the bag with a refrigerant, as previously described herein. Seals that combat this form of tampering have been introduced. However, as previously described herein, these prior art seals do not provide evidence of mere "freezing." Rather, the prior art seals simply provide evidence of a forced opening of the bag, whether or not the bag is first "frozen." In sharp contrast, seal 12 provided by the present invention provides a permanent visual indication if the seal is cooled below the breakdown temperature, regardless of whether or not the seal is actually forced open.

Furthermore, seal 12 provided by the present invention cannot be opened without ink layer 22 visibly delaminating, whether or not the seal is first "frozen." This is ensured by choosing a pressure sensitive adhesive for adhesive layer 24 that has a relatively low transition temperature. When a pressure sensitive adhesive is cooled to its transition temperature, the adhesive loses its adhesive properties, i.e., its adhesive tack. The adhesive is chosen so that its transition temperature is lower than the breakdown temperature of seal 12, at which temperature ink layer 22 delaminates from plastic strip 20. As a result, as the seal is progressively cooled, ink layer 22 at least partially delaminates from plastic strip 20 before the transition temperature of the pressure sensitive adhesive is reached. Thus, the ink delaminates before the seal is sufficiently "frozen" to allow the seal to be opened without any significant force.

It is important that the breakdown temperature of seal 12 be greater, i.e., at a higher temperature, than the transition temperature of the pressure sensitive adhesive, to ensure that the seal cannot be opened without detection. If, in contrast, the transition temperature is above the seal's breakdown temperature, a refrigerant could be used to cool the seal to the adhesive's transition temperature, at which point the adhesive would lose its adhesive tack and release from the upper end of back wall 18 and/or ink layer 22 and plastic strip 20. The bag could then be opened, and then after warming to room temperature be reclosed. As long as the temperature of the bag is kept above the breakdown temperature, no visual indication of tampering would exist.

Adhesive layer 24 and plastic strip 20 are also preferably chosen so that they expand at different relative rates when warmed, i.e., the plastic strip and adhesive layer have different thermal coefficients of expansion. In one preferred embodiment, the adhesive expands more and at a greater rate than plastic strip 20. As a result, if, after the seal is "frozen" below the breakdown temperature, a portion of ink layer 22 has not delaminated from plastic strip 20, the ink will further delaminate upon warming of seal 12. This further ensures that the delamination is sufficient to provide a significant visual indication of "freezing."

Figure 9A:
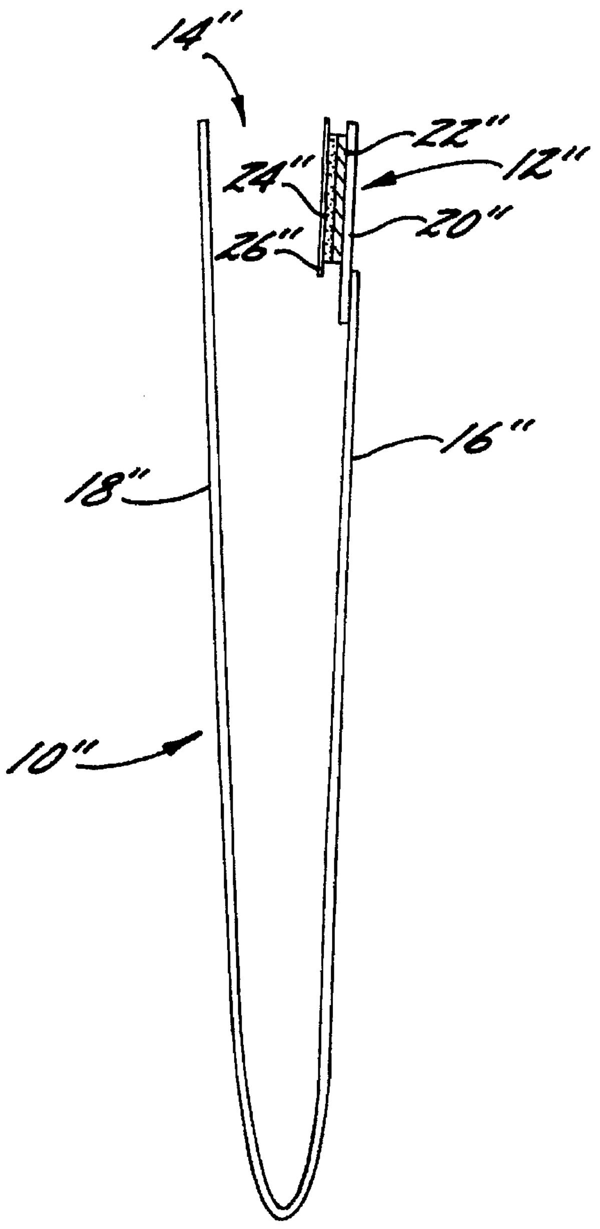
FIG. 9A is a side cross-sectional view of a bag including a tamper-evident tape formed in accordance with a further aspect of the present invention.
Figure 9B:
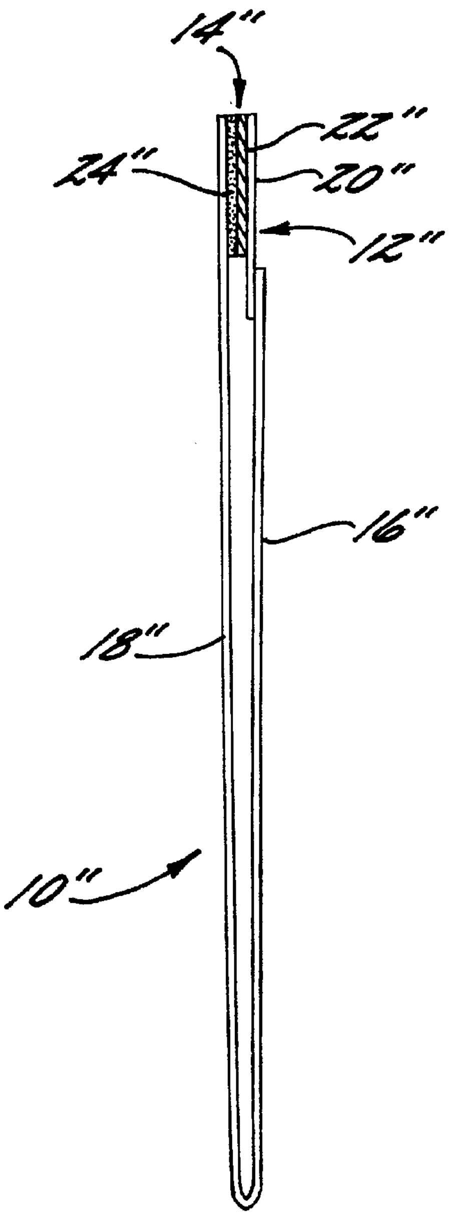
FIG. 9B is a side cross-sectional view of a bag with the tamper-evident tape sealing the bag closed.

The embodiment of seal 12 shown in FIGS. 1 and 2 is one preferred embodiment of the invention. FIGS. 9A and 9B illustrate a second embodiment. The second embodiment includes many of the same component parts as the first preferred embodiment; accordingly, like components are referred to with the same reference numerals, except that the reference numerals are double primed. In the second embodiment, adhesive layer 24" is applied to the inner surface of ink layer 22" instead of to the inner surface of the back wall 18". The free surface of adhesive layer 24" is covered with peel-back strip 26". The other structural aspects of seal 12" are the same as seal 12 in FIGS. 1 and 2. To close the seal, peel-back strip 26" is removed and the free surface of adhesive layer 24" is pressed against the inner surface of back wall 18". If the seal is forced open or "frozen," ink layer 22" visually delaminates, as described with respect to the first embodiment shown in FIGS. 1 and 2. While the second embodiment shown in FIGS. 9A and 9B is an alternative embodiment, the first embodiment shown in FIGS. 1 and 2 is preferred because adhesive 24 adheres more strongly to back wall 18 when applied hot, as described in more detail below, as opposed to adhesive layer 24" of the second embodiment that is pressed against back wall 18" to close seal 12".

While one preferred embodiment of a bag incorporating a seal formed in accordance with the present invention has been shown so far, various other bag structures can be formed. For example, with respect to FIG. 2A, if front wall 16 is formed of the same material as plastic strip 30, front wall 16 can be extended to the same height as back wall 18. Plastic strip 30 would then be eliminated and ink layer 22 would be printed on the inner surface of the upper end of front wall 16. As a further alternative, front wall 16 could be extended beyond the height of back wall 18, so that a fold-over closure flap is formed by the upper end of front wall 16. Adhesive layer 26 would then be applied to the outer surface of back wall 18, and the closure flap would be folded over the opening of the bag onto the adhesive on the outer surface of back wall 18.

Figure 10:
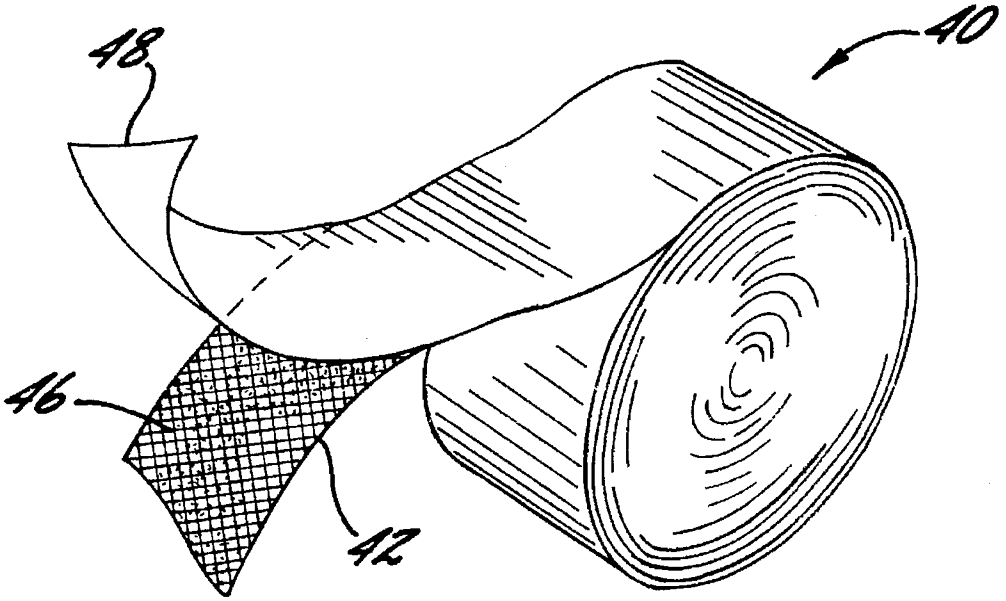
FIG. 10 is a pictorial view of a roll of tamper-evident tape formed in accordance with the present invention.
Figure 11:
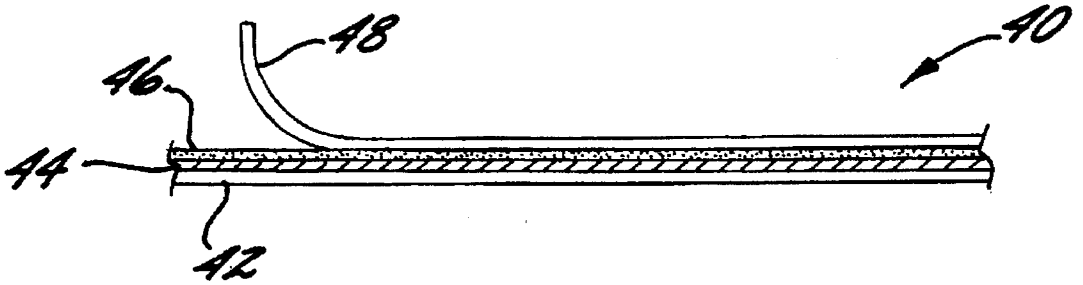
FIG. 11 is a side view of a section of a roll of tamper-evident tape formed in accordance with the present invention.

The seal provided by the present invention can be formed as a tape or label 40, as shown in FIGS. 10 and 11. The structure of tape 40 is essentially the same as the structure of seal 12" of the second embodiment shown in FIGS. 9A and 9B. Tape 40 includes a flexible, plastic backing 42, a layer of ink 44 printed on plastic backing 42, and a layer of adhesive 46 applied to the free surface of ink layer 44. Plastic backing 42 is analogous to plastic strip 20" in FIGS. 9A and 9B, and ink layer 44 is sandwiched between plastic backing 42 and adhesive layer 46. The free surface of adhesive layer 46 is covered with a peel-back strip 48. To apply tape 40 to an object, peel-back strip 48 is removed from a section of the tape then adhesive layer 48 is pressed onto the object to form a seal. As described with respect to bag 10 and 10", if tape 40 is forced off the object or if the tape is frozen below its breakdown temperature, ink layer 44 delaminates from plastic backing 42, to provide a visual indication of tampering.

Roll of tape 40 can be used in various applications to form seals on surfaces of containers such as bags and envelopes. For example, tape 40 could be used to seal an envelope. The tape could also be used to seal closed the opening of a bag as previously described herein. For example, bag 10 shown in FIG. 2A could be formed without seal 12, so that the bag simply consists of back wall 18 and front wall 16. Front wall 16 could be extended up beyond back wall 18, so that the upper end of front wall 16 forms a closure flap that can be folded over opening 14 onto the outer surface of back wall 18. The closure flap could then be secured onto back wall 18 with tape 40 by overlapping the tape over the closure flap and back wall 18. Alternatively, bag 10 shown in FIG. 2A could be formed without seal 12 and then the upper portion of back wall 18 could be folded over the upper end of front wall 16 to contact the outer surface of front wall 16. The closure flap could then be secured onto front wall 16 with tape 40 by overlapping the tape over the closure flap and front wall 16.

In addition to providing a tape for forming seals on containers, tape 40 can be printed on, for example, on plastic backing 42 to provide a label or other type of indicating means.

The seal provided by the present invention is preferably constructed of relatively simple, inexpensive, and nonhazardous materials. The seal is preferably manufactured on a continuous line system, using conventional equipment including printers and handling machines. With respect to seal 12 shown in FIG. 2A, plastic strip 20 is preferably formed of a high density polyethylene or other polyolefin such as polypropylene. Plastic strips 20 are preferably formed of polyethylene, as opposed to some other plastic such as polyester, so that the strips can be easily recycled. Preferably, plastic strip 20 is colored so as to contrast with the color of the ink of ink layer 22. For example, if the ink is blue, the plastic strip could be yellow. The plastic strip can be formed using an extrusion process as is commonly done in the plastics industry. Typically, to extrude polyethylene sheets, polyethylene pellets are melted and then extruded. To form colored plastic strips, color pigment, e.g., yellow pigment, is preferably added to the melted polyethylene, e.g., at a ratio of ten percent (10%) of the total mixture. In one preferred embodiment, the polyethylene sheets are formed of a thickness of approximately 2.3 mils. The polyethylene sheets are cut into approximately 1.125 inch strips, and then cut to length, to form plastic strips 20.

The ink of ink layer 22 is preferably a water-based ink that has a Ph of 7.5 to 8.2, such as Universal Reflex Blue sold by CPI Inks, Inc. However, other inks such as a solvent-based ink could be used. The ink is printed on the inner surface of plastic strip 20. Actually, the ink is preferably printed on the polyethylene sheets before the sheets are cut to form plastic strips 20. The pattern of ink does not have to be very exact; in fact, in one preferred embodiment the ink is printed as a uniform layer. Thus, inexpensive printing techniques can be used. For example, a flexographic press that includes a photo polymer print roller can be used to print the ink, even if a particular pattern is desired. The advantage of using a flexographic press is that the photo polymer roller for creating the print pattern is relatively inexpensive to manufacture. In contrast, a rotogravure printer, which includes steel printing plates and is much more expensive, has generally been used to hold more exact registration and produce more precise characters on the walls of plastic bags.

As previously described herein, while the precision of the pattern of ink is not critical, the thickness of the ink layer is important. Ink layer 22 must be sufficiently thin so that there are microscopic voids in the ink through which adhesive layer 24 can migrate and therefore adhere to plastic strip 20. If ink layer 22 is too thick, adhesive layer 24 will not migrate through the ink layer and adhere to the inner surface of plastic strip 20. Instead, the adhesive layer will only adhere to ink layer 22, which would result in a seal that is too weak. It is also important that the ink have a relatively weak bond or adhesion to the inner surface of plastic strip 20, so that ink layer 22 delaminates from plastic strip 20 if the seal is forced open or "frozen."

The structure and manufacturing process of the seal embodiment shown in FIGS. 1 and 2 do not involve any pretreating, such as with a corona discharge or a silicon releasant, of the inner surface of plastic strip 20. That is, the ink is applied without any intervening adhesion promoting material or pretreating, and without any intervening adhesion suppression material. Accordingly, this embodiment of the seal is very inexpensive to manufacture. For example, with respect to FIG. 2A, the inner surface of plastic strip 20 is not pretreated with a corona discharge process, because a relatively weak adhesion between the ink and plastic strip is desired. Furthermore, because a water-based ink is preferably used, which has a relatively weak adhesion with polyethylene, no releasants such as silicone are required.

With respect to FIG. 2A, ink layer 22 is preferably printed onto the inner surface of plastic strip 20 in a single coat, which involves printing wet ink onto plastic strip 20. The single coat of ink is uniform, i.e., a flood coat. While it is important that ink layer 22 is sufficiently thin so that there are voids in ink layer 22, there is a lower limit on how thin the ink should be. If ink layer 22 is extremely thin, there will not be a sufficient visual color contrast in the seal when ink layer 22 delaminates from plastic strip 20. In one preferred embodiment, an appropriate ink thickness is obtained by using a water-based ink that has a viscosity reading of 20 to 30 seconds with a #3 Zahn cup, and printing the ink on plastic strip 20 with a flexographic printer. After the wet ink is printed on plastic strip 20, the ink is thoroughly dried, for example, by using heat guns.

It is also possible to print a particular pattern of ink, e.g., a grid pattern, onto plastic strip 20. For example, using a flexographic press, two coats of ink could be printed onto plastic strip 20. The first coat of ink would be a flood coat that is uniform, and the second coat of ink would be applied in a grid pattern over the flood coat.

Regardless of the ink pattern used, the bottom end of plastic strip 20 is preferably secured to the inner surface of front wall 16 by a heat seal, e.g., a running heat sealer, as is commonly done to seal together plastic materials such as polyethylene. However, plastic strip 20 can also be attached in other ways, e.g., using an adhesive or glue. Plastic strip 20 is preferably secured to the inner surface, as opposed to the outer surface, of front wall 16 so that it is relatively easy to visually detect any slits or cuts made near plastic strip 20. While it is certainly possible to adhere plastic strip 20 to the outer surface of front wall 16, if this done, a slit, e.g., made using a razor blade, could be made under plastic strip 20 where plastic strip 20 is sealed to front wall 16. It would be difficult to visually detect such slits as the slits would be underneath the substantially opaque plastic strip 20.

As previously described, front wall 16 and back wall 18 are preferably formed of a plastic material, such as polyethylene. Common extrusion techniques can be used to form the back and front walls. The side edges of the back and front walls are preferably joined together by a heat seal. The bottom ends of the back and front walls are preferably formed of a single sheet of plastic that is folded to form the bottom end, as shown in FIG. 2A. Alternatively, two separate sheets of plastic could be used to form the back and front walls, in which case, the bottom ends of the walls would be joined together with a heat seal. Because the walls of the bag and plastic strip 20 are all preferably formed of polyethylene, the bag is recyclable.

As previously described, adhesive layer 24 is applied to the inner surface of back wall 18, as shown in FIG. 2A. The free surface of adhesive layer 24 is covered with peel-back strip 26. To close the seal 12, peel-back strip 26 is removed and the free surface of adhesive layer 24 is pressed against ink layer 22 as shown in FIGS. 2A and 2B. Preferably, no intervening materials are applied to the inner surface of back wall 18 or the inner surface of ink layer 22. As a result, when the seal is closed, adhesive layer 24 is in direct contact with the inner surface of back wall 18 and the inner surface of ink layer 22, as shown in FIGS. 2B.

In the preferred embodiment, adhesive layer 24 is formed of a pressure-sensitive adhesive that is rubber-based, has a relatively high liquid tactifier content, and is applied as a hot melt using an extrusion process. The adhesive must have a low transition temperature and simultaneously a relatively high internal cohesive strength. As previously described, it is important that the adhesive have a transition temperature that is below the breakdown temperature of the seal. Preferably, the adhesive has a transition temperature that is below −10° F. In addition to the requirement that the transition temperature be below −10° F., the adhesive preferably has the following characteristics: 180° peel strength of 7.9 lbs. (±0.4 lbs.) on steel; viscosity of 10,500 cps at 300° F., 3,900 cps at 325° F., 2,000 cps at 350° F.; a melting point of 181° F.; a SAFT reading of 500 gm/sq. in. at 143° F.; and an application temperature of 300°–325° F. In one preferred embodiment, the adhesive is clear so that ink layer 22 can be seen through back wall 18 and adhesive layer 24 when seal 12 is closed. Various adhesive compositions exist in the prior art. Based upon the preceding characteristics, an appropriate pressure-sensitive adhesive can be readily composed. Most likely, the basic ingredients of the adhesive include a rubber-base of synthetic block polymers with a liquid tactifier added to provide the specified viscosity. An adhesive having the preceding characteristics can be manufactured by various adhesive producers, including Swift Adhesives Co. and Ecomelt, Inc.

To apply the adhesive, the adhesive is melted and extruded onto the inner surface of back wall 18. Peel-back strip 26 is then placed over the free surface of the adhesive. In one preferred embodiment, the peel-back strip is formed of high density polyethylene, and the surface of the peel-back strip that is in contact with the adhesive is coated with silicon so that the peel-back strip easily releases from the adhesive. When the adhesive cools, a pressure sensitive adhesive is formed.

While the materials and manufacturing process were described in the context of a bag incorporating a seal as provided by the present invention, it will be readily appreciated that the materials and manufacturing process of tape 40 shown in FIGS. 10 and 11 are basically the same. In particular, tape 40 is formed of the same materials as in the same process as seal 12" shown in FIGS. 9A and 9B.

FIGS. 6A–E illustrate an alternative ink composition/pattern and manufacturing process for plastic strips 20 and

20" shown in FIGS. 2A and 9A. A seal incorporating the plastic strip 20' shown in FIGS. 6A–E has the benefits of being more difficult to force open and providing a more visible indication of a forced opening than the previously described embodiments. The drawback of the embodiment shown in FIGS. 6A–E is that the resulting seal does not evidence refrigerant tampering as effectively as the previously described embodiments. The ink/plastic strip embodiment shown in the top views in FIGS. 6A–D and the side cross-sectional view in FIG. 6E includes a plastic strip 20', a patterned layer of clear ink 60 (e.g., ink extender), and a uniform layer of colored ink 62. Plastic strip 20' is preferably formed of a high density polyethylene, as previously described plastic strip 20. Preferably, plastic strip 20' is colored, e.g., yellow.

Figure 6A:
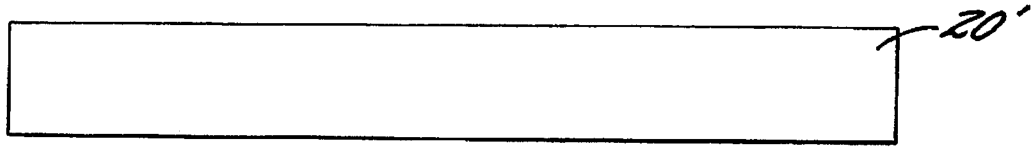
FIGS. 6A–6D are top views of a plastic strip formed in accordance with a further embodiment of the present invention.
Figure 6B:
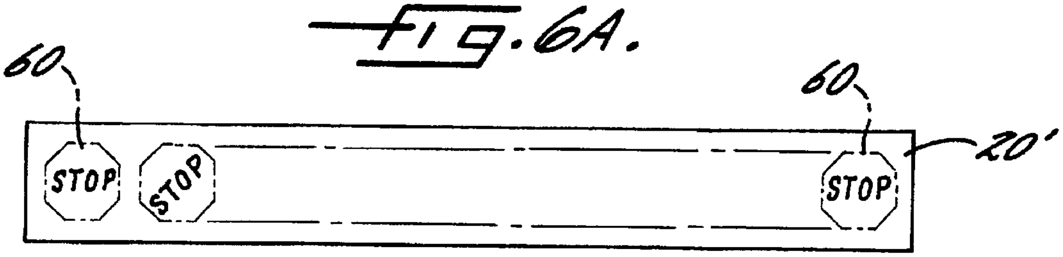
Figure 6C:
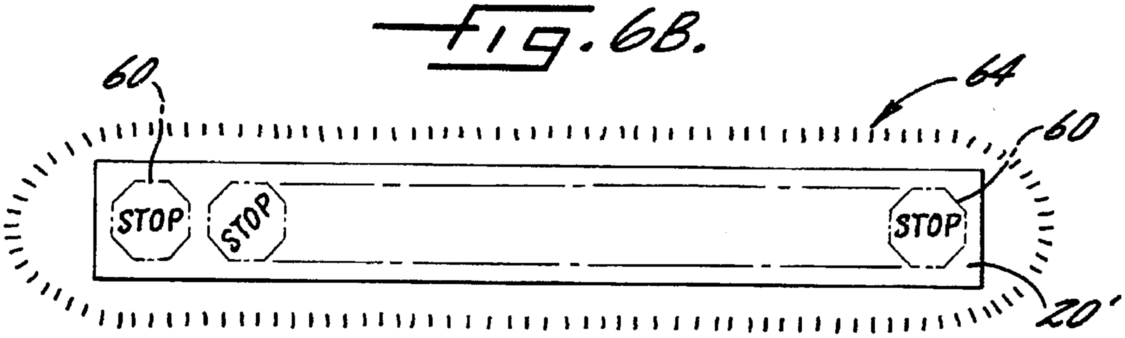
Figure 6D:
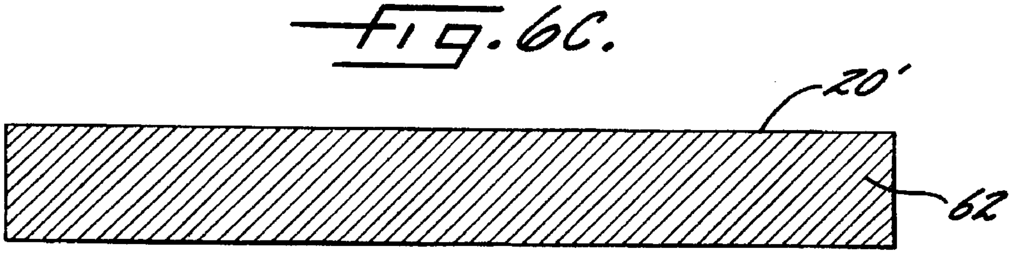
Figure 6E:
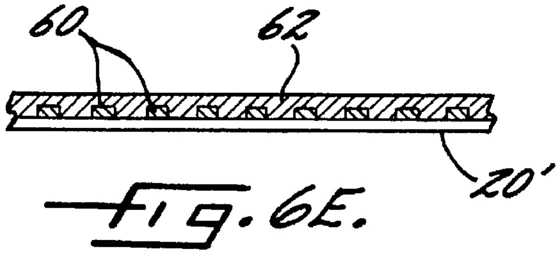
FIG. 6E is a side cross-sectional view of the plastic strip shown in FIGS. 6A–6D.

Patterned layer of clear ink 60 is printed, e.g., using a flexographic press, onto an untreated surface of plastic strip 20'. Clear ink 60 should have a weak affinity to untreated polyethylene and should be able to withstand a corona discharge process as described in the following. Preferably, ink 60 is a water-based ink as previously described, except that ink 60 contains no pigment so that the ink is clear. For example, colorless, water-based ink extender manufactured by CPI Inks, Inc. sold under the name Universal Flex Extender can be used. However, a solvent-based ink extender could also be used. Ink 60 is printed in a selected pattern, so that the majority of the surface of plastic strip 20' is free of clear ink 60. As shown in FIG. 6B, in one preferred embodiment, clear ink 60 is printed as a series of "stop signs."

After clear ink 60 is applied and dried, e.g., using a heat gun, the surface of plastic strip 20' on which clear ink 60 is applied is treated with a corona discharge process to roughen and increase the surface energy of plastic strip 20', as illustrated pictorially by line dashes 64. In one preferred embodiment, a corona discharge treater set to a strength of approximately 43 to 50 dynes is used. The corona discharge process is used so that colored ink 62 adheres well to plastic strip 20'. In particular, after plastic strip 20' is subjected to a corona discharge, colored ink 62 is printed as a uniform layer over plastic strip 20', so as to cover the entire surface of plastic strip 20'. In place of using a corona discharge process, the plastic strip 20' could be subjected to plasma treatment, chemical treatment, or time treatment.

Figure 7:
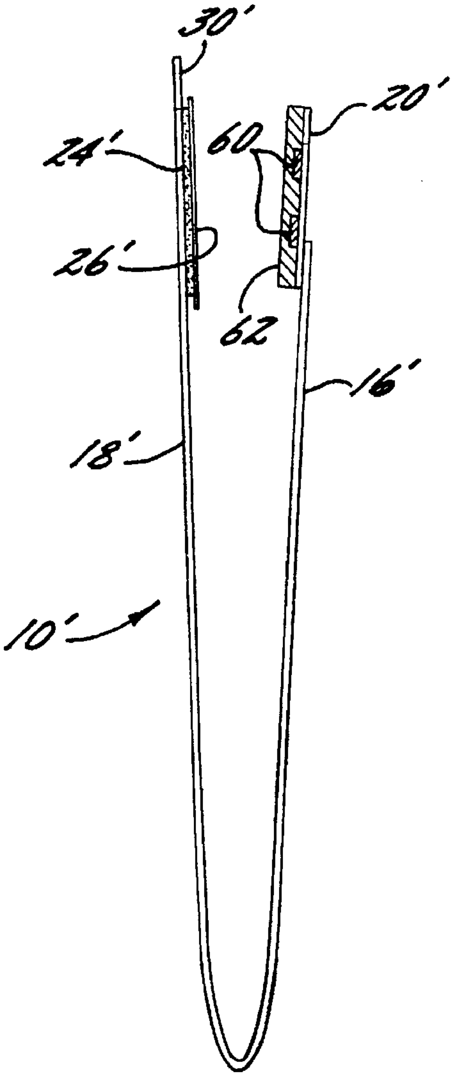
FIG. 7 is a side cross-sectional view of a bag with a tamper-evident seal including the plastic strip shown in FIGS. 6A–6E in accordance with the invention.
Figure 8B:
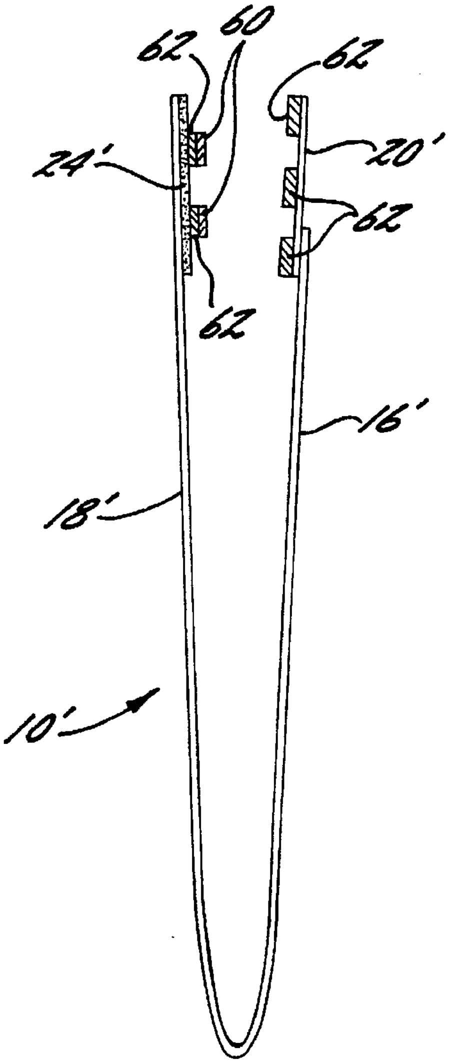
FIG. 8B is an end cross-sectional view of the seal in FIG. 8A, illustrating the delamination of the portion of the seal that is forced open.

FIG. 7 is a side cross-sectional view of a bag 10' incorporating plastic strip 20' to form a seal 12'. When seal 12' is closed, colored ink layer 62 is sandwiched between adhesive layer 24 and plastic strip 20'. Because plastic strip 20' is subjected to a corona discharge process before the application of colored ink 62, colored ink 62 forms a strong adhesion with those portions of plastic strip 20' not covered with clear ink 60. As a result, if an attempt is made to force open seal 12', colored ink 62 will not delaminate from plastic strip 20', except along the pattern where clear ink 60 was applied, as shown in FIG. 8B. Colored ink 62 does not delaminate from plastic strip 20' because colored ink 62 adheres more strongly to the treated portions of plastic strip 20' than to adhesive 24. However, because clear ink 60 was applied to the untreated surface of plastic strip 20', clear ink 60 does not adhere very well to plastic strip 20'. As a result, colored ink 62 and clear ink 60 delaminate from plastic strip 20' along the pattern of clear ink 60 when an attempt is made to force the seal open.

Figure 8A:
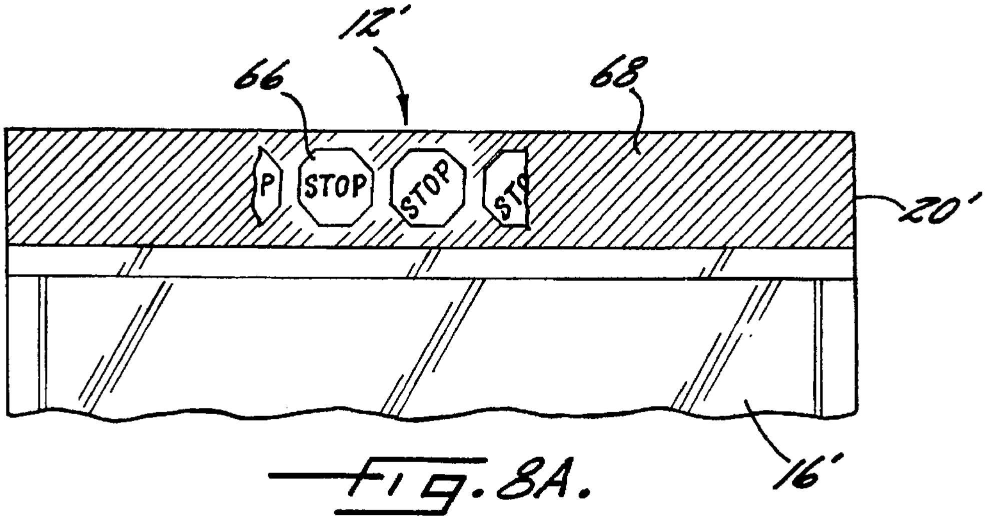
FIG. 8A is a front view of the bag shown in FIG. 7, illustrating the visual appearance of the seal when a portion of the seal is forced open.

Colored ink 62 is chosen to have a color that contrasts with the color of plastic strip 20'. In one preferred embodiment, plastic strip 20' is yellow and colored ink 62 is blue. Preferably, colored ink 62 is water-based, as is the case for previously described ink layer 22. Because the color of colored ink 62 contrasts with the color of plastic strip 20', the pattern in which clear ink 60 was applied boldly appears when an attempt is made to force open the seal. For example, as indicated in FIG. 8A when a portion 66 of seal 12' is forced open, the "stop sign" pattern appears, whereas an untampered portion 68 of seal 12' appears uniformly opaque. The delamination of colored ink 62 and clear ink 60 in portion 66 of seal 12' is shown in FIG. 8B, which is an end cross-sectional view of portion 66 shown in FIG. 8A.

Because colored ink 62 adheres much more strongly to treated plastic strip 20' than ink layer 22 previously described with reference to FIG. 2A, seal 12' illustrated in FIG. 8 is much more difficult to open. After being closed, if seal 12' is quickly "frozen" with a refrigerant, some "stop signs" will appear as a result of clear ink 60 delaminating from plastic strip 20' due to the differential shrink rates between plastic strip 20' and adhesive 24'. However, because colored ink 62 adheres strongly to the majority of the surface of plastic strip 20', colored ink 62 provides structural support that prevents the differential shrink rates from delaminating clear ink 60 as readily as ink layer 22 in the previously described embodiments.

Other than the differences specifically described hereinabove, the manufacturing process and materials of seal 12' are the same as for previously described seal 12 and 12" shown in FIGS. 2A and 9A. For example, both clear ink 60 and colored ink 62 are preferably water-based with a viscosity reading of 20 to 30 seconds with a #3 Zahn cup, and the inks are preferably applied using a flexographic printer.

While the preferred embodiments of the invention have been illustrated and described, it will be appreciated that various changes can be made therein without departing from the spirit and scope of the invention. Accordingly, the scope of the invention is not to be limited by the description of the preferred embodiments, but instead should be determined by reference to the claims that follow.

The embodiments of the invention in which an exclusive property or privilege is claimed are defined as follows:

1. A tamper-evident tape for use in forming a closure for a security bag which will provide a visual indication of both opening of the closure and cooling of the closure below a breakdown temperature even if the closure is not opened, said tape comprising:

an elongate flexible plastic strip being adapted to be secured to one wall of a bag at an opening into the bag and having one surface thereof adapted to face another wall of the bag, said plastic strip having a first rate of thermal contraction or expansion, a layer of ink applied to first portions of the surface of said plastic strip adapted to face the other wall of the bag and having an initial adhesion to that surface of said strip, said initial adhesion being lost upon separation of said ink layer from said plastic strip and said ink layer thereafter having no adhesive affinity for said strip, a layer of adhesive applied to the surface of said strip having said ink layer thereon, including second portions thereof not covered by said ink layer, such that said ink layer is between said strip and said layer of adhesive, said adhesive layer having an adhesive tack at temperatures above a glass transition temperature at or below which said layer of adhesive loses its tack and being adhered to said strip and to said ink layer so long as said adhesive layer has the adhesive tack, said adhesive layer being adapted to contact and adhere to the other wall of the bag to close the opening into the bag to provide a secure closure therefor, said adhesive layer having a second rate of thermal contraction or expansion different from said first rate of contraction or expansion of said plastic strip, said ink layer having a greater adhesion to said adhesive layer than its initial adhesion to said plastic strip and said adhesive layer having a greater adhesion to said plastic strip and for the other wall of a bag than said initial adhesion of said ink layer to said plastic strip so that said ink layer will separate from said plastic strip before said adhesive layer will separate from said plastic strip and will give a visual indication upon separation of said ink layer from said plastic strip, and said tape having a breakdown temperature substantially lower than ambient temperature but higher than said glass transition temperature of said adhesive layer, below which said initial adhesion of said ink layer to said plastic strip is lost because of said differential rates of contraction or expansion and said ink layer will separate from said plastic strip.

2. The tamper-evident tape of claim 1, wherein said adhesive layer and said plastic strip are selected to have different relative rates of shrinking when cooled, so that when said tape is cooled, said adhesive layer and said plastic strip shrink at different rates causing said ink layer to delaminate.

3. The tamper-evident tape of claim 1, wherein said adhesive layer and said plastic strip are selected to have different relative rates of expansion when warmed, so that upon warming after being cooled below said breakdown temperature, said adhesive layer and said plastic strip expand at different rates causing said ink layer to delaminate.

4. The tamper-evident tape of claim 1, wherein:

said ink layer has first and second surfaces, and said first surface of said ink layer is in direct contact with and adhered to one surface of said plastic strip without any intervening adhesion promoting material, without any adhesion promoting pretreating of said one surface of said plastic strip, and without any intervening adhesion suppression material; and said adhesive layer has first and second surfaces, said first surface of said adhesive layer in direct contact with and adhered to said second surface of said ink layer.

5. The tamper-evident tape of claim 4, wherein said plastic strip is formed of polyethylene, and said ink layer is water based.

6. The tamper-evident tape of claim 1, wherein said ink layer is a water-based ink.

7. The tamper-evident tape of claim 1, wherein said polyolefin strip comprises polyethylene.

8. A tamper-evident tape for providing a closure seal for a security bag comprising:

an elongate, flexible plastic strip adapted to be secured to one wall of a security bag at an opening thereinto and having a major surface thereof adapted to face another wall of the bag, said plastic strip having a first rate of thermal contraction or expansion, a visual indicating layer adhered to first portions of said major surface of said plastic strip with an initial adhesion, said indicating layer being separable from said plastic strip upon said initial adhesion being overcome to give a visual indication of such separation and thereafter having no adhesive affinity for said plastic strip, an adhesive layer applied to said major surface of said plastic strip and to said indicating layer, said adhesive layer having an adhesive tack above a glass transition temperature at or below which said adhesive layer loses its adhesive tack and being adhered to said indicating layer and to said portions of said plastic strip other than said first portions to which said indicating layer is initially adhered, said adhesive layer being adapted to adhere to another wall of the security bag to complete the closure, said adhesive layer having a greater adhesion to said plastic strip and to said indicating layer than said initial adhesion of said indicating layer to said plastic strip so that said indicating layer will separate from said plastic strip before said adhesive layer will separate from said plastic strip and said indicating layer, said adhesive layer having a second rate of thermal contraction or expansion different from said first rate of contraction or expansion of said plastic strip, and said plastic strip, indicating layer and adhesive layer being responsive to cooling substantially below ambient temperature but above the glass transition temperature of said adhesive layer to cause said indicating layer to separate from said plastic strip, by said differential rates of contraction or expansion whether or not said adhesive layer separates from said plastic strip or the other wall of the bag.

9. The tamper-evident tape of claim 1, wherein said adhesive layer and said plastic strip are selected to have different relative rates of shrinking when cooled, so that when said tape is cooled, said adhesive layer and said plastic strip shrink at different rates causing said visual indicating layer to visibly distort.

10. The tamper-evident tape of claim 1, wherein said adhesive layer and said plastic strip are selected to have different relative rates of expansion when warmed, so that upon warming after being cooled below said breakdown temperature, said adhesive layer and said plastic strip expand at different rates causing said visual indicating layer to visibly distort.

11. The tamper-evident tape of claim 8, further comprising printing on the plastic strip.

12. The tamper-evident tape of claim 1, wherein said plastic strip is colored to have a color that contrasts with the color of said ink layer, thereby increasing the ease with which said delamination of said ink layer can be seen.

* * * * *

UNITED STATES PATENT AND TRADEMARK OFFICE

CERTIFICATE OF CORRECTION

PATENT NO. : 5,631,068

DATED : May 20, 1997

INVENTOR(S) : Christopher A. Smith

It is certified that error appears in the above-identified patent and that said Letters Patent is hereby corrected as shown below:

On the title page, Columns 1-2, under "References Cited - FOREIGN PATENT DOCUMENTS", line 6, "11/1988" should be -- 10/1988 --;

Column 8, line 65, after "tape" insert -- and --;

Column 9, line 24, delete "on" (first occurrence);

Column 10, line 60, after "this" insert -- is --;

Column 12, line 44, "time" should be -- flame --;

Column 13, line 63, delete "glass";

Column 14, line 17, delete "glass";

UNITED STATES PATENT AND TRADEMARK OFFICE
CERTIFICATE OF CORRECTION

PATENT NO. : 5,631,068

DATED : May 20, 1997

INVENTOR(S) : Christopher A. Smith

It is certified that error appears in the above-identified patent and that said Letters Patent is hereby corrected as shown below:

Column 15, line 3, delete "glass";

Column 15, line 22, delete "glass";

Column 16, line 4, "1" should be -- 8 --;

Column 16, line 10, "1" should be -- 8 --;

Signed and Sealed this

Sixteenth Day of December, 1997

Attest:

BRUCE LEHMAN

*Attesting Officer* *Commissioner of Patents and Trademarks*